United States Patent Office 3,429,742
Patented Feb. 25, 1969

3,429,742
RED STAINED SODA LIME GLASS
Peter Grego and Robert G. Howell, Corning, N.Y., assignors to Corning Glass Works, Corning, N.Y., a corporation of New York
No Drawing. Filed Sept. 10, 1965, Ser. No. 486,531
U.S. Cl. 117—124                                                7 Claims
Int. Cl. C03c 17/06

ABSTRACT OF THE DISCLOSURE

Method of staining the surface of a soda lime glass to produce a red colored article by applying to the surface of the glass a copper-staining paste, heating the glass in a mild reducing atmosphere at a temperature to ion exchange copper ions for sodium ions, then heating the glass in a hydrogen containing atmosphere until the copper ions are substantially reduced to metallic copper, and finally firing the glass at a temperature sufficient to develop in the glass a red color.

---

This invention relates to a method of coloring glass and more particularly to an improved method of copper staining soda lime glass to produce red colored articles.

It is well known to produce a coloration in the glass surface which may vary from yellow to dark amber by thermally introducing copper and silver ions into the glass surface in exchange for sodium ions. The practice involves preparing a homogeneous staining paste that contains, as active ingredients, compounds of copper and silver and applying this paste uniformly to the glass surface to be stained. Thereafter the paste is dried and the coated glass is heated to a temperature somewhat above the glass annealing point, but well below the softening point. The coated glass is held at the temperature for a period of about one hour to produce a medium dark amber color in the surface. In our prior patent, U.S. 3,079,264, we noted that the rate of ion exchange in the copper-silver staining process was greatly accelerated by the presence of the small amount of lithium salt in the staining paste. Unfortunately, according to that process, we were not able to obtain red stained glass materials.

Recently there has arisen a need in the automotive industry for red colored bulbs for use as signal lights and as brake lights. Heretofore it was common practice to use red plastic or glass lenses illuminated by clear lamp bulbs. It was therefore necessary, but somewhat restricting to automotive designers, to use separate lenses for red signal lights and clear backup lights.

To provide uniform color standards for colored incandescent lamps employed in motor vehicle lighting equipment, the Society for Automotive Engineers (abbreviated as SAE) has recommended certain characteristics. These are set forth under Color Specification for Electric Lamps, SAE J–578. The fundamental specification of the colors is expressed in terms of the standard observer, coordinate system, and Illuminant A (incandescent lamp operated at 2854° K., Planck's constant, $C_2$, taken equal to 14,350 micron degrees) adopted by the International Commission on Illumination in 1931 and described in the Journal of the Optical Society of America, volume 23, October 1933, page 359. In this specification, a red transmitting medium is defined as a medium which when illuminated with CIE Standard Illuminant A, transmits light for which $y$ is not greater than 0.335 and $z$ is not greater than 0.008. While SAE does not recommend conformity to specific luminous transmission requirements, it is desirable that the transmission for red automotive lamps be at least 12%.

It is, therefore, an object of the present invention to provide a red colored glass bulb which conforms to the standards set forth hereinabove.

It is another object of the invention to provide a staining composition for producing a red stain of high purity for soda lime glass.

In accordance with the present invention, we have discovered a method of staining the surface of soda lime glass to produce a red colored article which conforms to the SAE standards described above. The glass articles are stained by applying to the surface of the glass a copper staining composition, treating the glass at temperatures of 425–475° C. in the presence of a mild reducing atmosphere to exchange copper ions from the composition with alkali metal ions from the glass surface, heating the glass at a temperature of 450–500° C. in a hydrogen containing atmosphere to reduce the copper ions whereby a blackened glass is obtained, and firing the blackened glass below the softening point at a temperature of 600–650° C. until the prescribed red colored article is obtained. Motor vehicle lamp bulbs made from red colored blanks prepared by the present process have a minimum luminous transmission (Y) of 12%.

The glass composition from which the bulbs are prepared is a standard soda lime glass such as glass code 0081 sold commercially by the Corning Glass Works. The composition of a typical glass given in weight percent on the oxide basis, is silica 73%, sodium oxide 17%, calcium oxide 5%, magnesium oxide 3%, and 2% other conventional glass making oxides ($Al_2O_3$, $B_2O_3$, $K_2O$, etc.). The method of the present invention is preferably used on a glass composition essentially free of polyvalent ions such as antimony and arsenic which frequently are added to glasses as fining agents.

The staining compositions suitable for the practice of the present invention contain generally one or more copper compounds or salts such as copper oxides, copper sulfides, copper sulfates, or copper chlorides. The copper ion content of the paste solids should be at least in excess to the percent of alkali metal ion present in the glass. The balance of the solids are largely inert materials, such as clay, ochre, or barium carbonate. These solids are dispersed or suspended in a vehicle, such as water, by milling or grinding in the usual manner to provide a homogeneous paste or suspension which is applied to the glass as by brushing, spraying, or dipping. The vehicle is then evaporated slowly to avoid bubbling and the coated glass is placed in a suitable heated kiln.

In one embodiment of the present invention, the improved purity of red color is obtained by the presence of trace amounts of silver ions in the staining composition which we assume acts as a nucleating agent for the copper. By purity of red color in this type of stain, we mean that the wave lengths in the 520 millimicron portion of the spectrum are substantially completely absorbed. An indication of the effectiveness of the addition of trace amounts of silver compound to the staining composition is a reduction in the $z$ value of the Trichromatic Coordinate System. The amount of silver ions which should be present in the staining paste is dependent on the copper ion content. We have found that the effective range in parts by weight for the ratio of silver to copper ions in the paste is about a ratio of 0.1–0.6 part of silver ions to 100 parts of copper ions. Best results are obtained when using a preferred paste containing 0.2–0.3 part of silver ions to 100 parts of copper ions. The required amount of silver ions may be supplied by using silver sulfide, silver sulfate, silver oxide, or silver nitrate; however silver halides, e.g., silver chloride, are undesirable and should not be used because the halide tends to evolve oxidizing gases that may produce undesirable effects.

The process of the present invention requires a series of three heating steps. During the first heating step, an ion exchange occurs between the copper in the staining composition and the alkali metal of the glass. Since the copper initially may be present in its divalent form and is not capable of ion exchanging until it becomes monovalent, a mild reducing atmosphere, such as sulfur dioxide is required. As one of the important features of our invention, the depth of penetration to a large extent depends upon the temperature of the reaction and the time during which the heating is maintained. The depth of ion exchange into the surface of the glass should be in the range of about 8–25 microns. In the initial heating step the temperature should be between 425–475° C. for a period of approximately 10–30 minutes. The glass at this stage turns a pale yellow. Upon cooling the glass, the staining residue is quite brittle and will flake or can be peeled off to facilitate removal.

Thereafter, the second heating step is performed in the presence of hydrogen gas which acts as a reducing atmosphere. The use of hydrogen gas is important in that it reduces the copper at the surface of the glass and to some extent also reduces the copper within the glass itself. Hydrogen may be added as hydrogen gas or as a material which upon heating will generate hydrogen gas such as formaldehyde, cracked natural gas, and charcoal. The amount of hydrogen gas present in preferably about 20% by volume with the remainder being an inert gas, such as nitrogen. Again, the temperatures and the time of the heating are critical features. The second heating step should be performed at a temperature of 450–500° C. for a period of about 20–60 minutes. It is desirable that the reduction of the copper be sufficiently complete as indicated by a blackened color. When reduction is performed for longer periods of time, a "bloom" forms on the surface of the glass and surface defects result. Also, prolonged reduction may affect other elements in the glass. It is possible to determine experimentally whether the desired amount of reduction has occurred by removing the outer darkly stained layer of glass with hydrofluoric acid and observing an absence of yellow color.

The third heating step is performed at an elevated temperature of from 600–650° C. for a period of 10–30 minutes. It is necessary that care be taken not to operate at higher temperatures at which distortions of the glass bulbs being stained may occur. The type of atmosphere present in the last heating step is much broader than the preceding ones. Gases such as air, nitrogen, and sulfur dioxide were found to be quite satisfactory. However, continued heating in hydrogen gas is unsatisfactory and results in the glass remaining a dark black color. The final color obtained by following our novel method is a bright red which falls within the SAE specification set forth above.

Our invention is further illustrated by the following examples:

EXAMPLE I

A group of lamp bulb preforms for automotive lamps were manufactured on a ribbon machine from a commerical soda lime glass composition composed of about 73% $SiO_2$, 17% $Na_2O$, 5% CaO, 3% MgO, and 2% other conventional glass making oxides ($Al_2O_3$, $B_2O_3$, $K_2O$, etc.)

A staining composition was prepared containing 50 grams of cupric oxide, 0.1 gram silver sulfide, 49 grams of barium carbonate, 1.0 gram bentonite, and 120 ml. of distilled water. The slurry was ball milled for 72 hours in a one quart jar and the consistency was adjusted to give 0.3 gram per bulb being stained. The preformed bulbs were dipped into the staining composition inverted and permitted to air dry.

The coated bulbs were then baked in an air furnace at 450° C. for 15 minutes in an atmoshpere containing sulfur dioxide. On completion of the firing, the bulbs were taken from the furnace and the residual coating removed with water. At this step, the bulbs exhibited a pale yellow color.

The ion exchange bulbs were then fired in a 20% hydrogen-80% nitrogen atmosphere at a temperature of 480° C. for 30 minutes to reduce the cuprous ions in the glass to colloidal metallic particles. After removing the bulbs from the furnace and cooling, the bulbs appeared black in color.

Thereafter, the bulbs were fired again at a temperature of 640° for 10 minutes in an air atmosphere. The treatment in air apparently consolidated and increased the particle size to form a stain of high purity red color.

The preliminary evaluation of the red stain was performed with a system of filtered photovoltaic cells. The luminous transmission was measured in candle power with a Weston Illumination meter, model 756, which was visual and cosine corrected. The color purity was recorded by measuring the reading at 520 millimicrons using a Corning filter Color Specification No. 4–105 (narrow-bandpass filter) on an uncorrected photovoltaic cell.

The energy levels of this cell were measured in millivolts on a vacuum tube microvolt meter. The light source was a 6 volt lamp with a constant voltage transformer. The red stain bulb blanks were superimposed over the lamp. For more precise values of the color quality, the measurements were made on a spectrophotometer and the chromaticity coordinates calculated.

The specification for the red color are expressed in terms of the chromaticity coordinates, $x+y+z=1$. The desired red-transmitting medium is one which when illuminated by source "A" (incandescent lamp operated at 2,848° K.) transmits light for which $y$ is less than 0.335 and $z$ is not greater than 0.008. It was found that on an average the bulbs prepared according to this method had a $z$ value of 0.0056 and a luminous transmission "Y" of 14%.

EXAMPLE II

Using the apparatus and following the procedure of Example I, soda lime glass lamp blanks were dipped in a slurry containing 50 grams of cupric oxide, 49 grams barium carbonate, 1 gram bentonite, and 120 ml. of water. The lamp bulbs prepared using this stain, in which the silver ions were absent, had a $z$ value of 0.0056 and an average luminous transmission of 12%. Since the $z$ value is used to determine color purity, it is apparent from a comparison with the colored bulbs in Example I that the presence of silver ions in a staining solution produces an enhanced transmission for stained lamps having approximately the same color purity.

EXAMPLE III

Using the apparatus and procedure of Example I, and the staining slurries of Examples I and II, the temperatures of the first heating step were varied from 450° for 15 minutes to 550° for 15 minutes. The depth of stain penetration was measured by a light microscope.

The results are shown in the table below in which the –I experiments were performed using the silver containing stain of Example I and the –II experiments were performed using the staining slurries of Example II which were free of silver ions. The three heating steps have been designated as step A run for 15 minutes; step B run for 30 minutes; and step C run for 10 minutes.

TABLE I.—RED STAINED SODA LIME BULBS

| Exp. No. | Step A, Temp. (deg.) | Depth, microns | Step B, temp. (deg.) | Step C, temp. (deg.) | Color, z value | Trans., Y |
|---|---|---|---|---|---|---|
| A-II | 450 | 8–10 | 480 | 640 | .0056 | 12.0 |
| A-I | 450 | 8–10 | 480 | 640 | .0056 | 14.0 |
| B-II | 500 | 16–18 | 480 | 640 | .0064 | 11.7 |
| B-I | 500 | 16–18 | 480 | 640 | .0016 | 10.4 |
| C-II | 550 | 20–25 | 480 | 640 | .0016 | 8.0 |
| C-I | 550 | 20–25 | 480 | 640 | .0007 | 8.1 |

The table shows that at the greater the temperature of the heating step, the greater the depth of penetration of ion exchange of copper ions for sodium ions. A comparison between the effects of the slurry in which silver was present and the slurry in which silver was absent indicates that the presence of silver in small amounts in the copper staining composition enhances the red color purity and increases the luminous transmission.

We claim:
1. A method of copper-staining the surface of a soda lime glass to produce a red colored article comprising applying to the surface of said glass a copper staining composition, treating the glass at a temperature of 425–475° C. for a period of 10–30 minutes in the presence of a mild reducing atmosphere to ion exchange a thin layer of copper at the surface of the glass, thereafter heating the glass at a temperature of 450–500° C. for a period of 10–30 minutes in a hydrogen containing atmosphere to reduce the copper ions, and firing the glass at a temperature of 600–650° C. for a period of 10–30 minutes to develop in said glass a red color having C.I.E. chromaticity coordinates of $y$ being not greater than 0.335 and $z$ being not greater than 0.008 using Standard Illuminant A.

2. A method of copper-staining the surface of a soda lime glass to produce a red colored article comprising the steps of:
   (a) applying to the surface of said glass a copper staining composition,
   (b) treating the glass at a temperature of 425–475° C. for a period of 10–30 minutes in the presence of a sulfur dioxide containing atmosphere to ion exchange a thin layer of copper at the surface of the glass,
   (c) thereafter heating the glass at a temperature of 450–500° C. for a period of 20–60 minutes in a hydrogen containing atmosphere to reduce the copper ions whereby a blackened glass is obtained, and
   (d) firing the blackened glass at a temperature of 600–650° C. for a period of 10–30 minutes in an oxidizing atmosphere to develop in said glass a red color having C.I.E. chromaticity coordinates of $y$ being not greater than 0.335 and $z$ being not greater than 0.008 using Standard Illuminant A.

3. The method of claim 2 wherein said staining composition is an aqueous slurry containing a compound of copper selected from the group consisting of copper oxides, copper sulfides, copper sulfates, and copper chlorides.

4. The method of claim 2, wherein said aqueous slurry contains additionally a trace amount of a silver compound calculated in parts by weight as 0.1–0.6 part of silver ions to 100 parts of copper ions.

5. The method of claim 4, wherein said silver compound is a member selected from the group consisting of silver sulfide, silver sulfate, silver oxide, and silver nitrate.

6. The glass article made by the method of claim 4.

7. A method of copper-staining the surface of a soda lime glass to produce a red colored article comprising the steps of:
   (a) applying to the surface of said glass an aqueous slurry of a composition comprising on a solids basis about 50% by weight of copper oxide and silver sulfide in an amount of 0.1–0.6 part by weight of silver ions per 100 parts of copper ions;
   (b) treating the glass at a temperature of about 450° C. for approximately 15 minutes in the presence of a sulfur dioxide containing atmosphere to ion exchange a thin layer of copper at the surface of the glass to a depth of 8–10 microns;
   (c) thereafter heating the glass at a temperature of about 480° C. for approximately 30 minutes in a reducing atmosphere containing at least about 20% by volume of hydrogen to reduce the copper ions whereby a blackened glass is obtained, and
   (d) firing the blackened glass at a temperature of about 640° C. for approximately 10 minutes in an air atmosphere to develop in said glass a red color having C.I.E. chromaticity coordinates of $y$ being not greater than 0.335 and $z$ being not greater than 0.008 using Standard Illuminant A and having a minimum luminous transmission of 12 percent.

References Cited

UNITED STATES PATENTS

| | | | |
|---|---|---|---|
| 2,075,446 | 3/1937 | Leibig | 117—124 X |
| 2,662,035 | 12/1953 | Levi | 106—34 |
| 2,701,215 | 2/1955 | Kroeck. | |

ALFRED L. LEAVITT, *Primary Examiner.*

H. COHEN, *Assistant Examiner.*

U.S. Cl. X.R.

65—30, 60